March 10, 1964 W. J. CIESLIK 3,124,363
PUMP SEAL
Filed Jan. 30, 1962

Inventor:
Walter J. Cieslik
By: W. S. McCurry Atty.

United States Patent Office 3,124,363
Patented Mar. 10, 1964

3,124,363
PUMP SEAL
Walter J. Cieslik, Cleveland, Ohio, assignor to Borg-Warner Corporation, Chicago, Ill., a corporation of Illinois
Filed Jan. 30, 1962, Ser. No. 169,895
5 Claims. (Cl. 277—42)

This invention relates to a pump seal, more particularly to a shaft seal for cryogenic applications, which seal includes a novel arrangement incorporating a dampening lock ring to present leakage.

The invention is broadly concerned with a shaft seal which includes a stationary sealing member in running engagement with a rotary seal face on a shaft and is adapted to be fitted in a housing.

The seal comprises a body member, an annular sealing ring, and a bellows connecting the sealing ring to the body member. Since the bellows member is axially compressable, it provides the force to load the sealing ring against the runing member on the rotary shaft.

The seal arrangement described above is a conventioaln seal which has been available on the market for years. However, for certain purposes, particularly cryogenic applications, this type of seal fails to effectively prevent leakage. The problem is caused by the tendency of the stationary sealing ring to rotate with the shaft thereby twisting relative to the seal body member. At high shaft speeds, this twisting action causes the stationary sealing ring to vibrate or cock against the running seal face on the shaft resulting in serious leakage across the sealing surface.

The improved sealing means of the present invention includes a dampening lock ring, positioned in the annular space between the seal body member and the seal ring, which, in its preferred form, is of a generally square configuration having its corners in engagement with the seal body and the intermediate portions of its sides in engagement with the seal ring. This arrangement effectively dampens vibration resulting from the tendency of the seal ring to rotate conjointly with the shaft and relative to the seal body member.

Accordingly, it is an object of the present invention to provide an improved shaft seal including means for effectively preventing leakage across the sealing face.

Other and more particular objects, advantages, and uses of my invention will become apparent from the reading of the following specification taken in connection with the accompanying drawings forming a part thereof and wherein.

Figure 1:
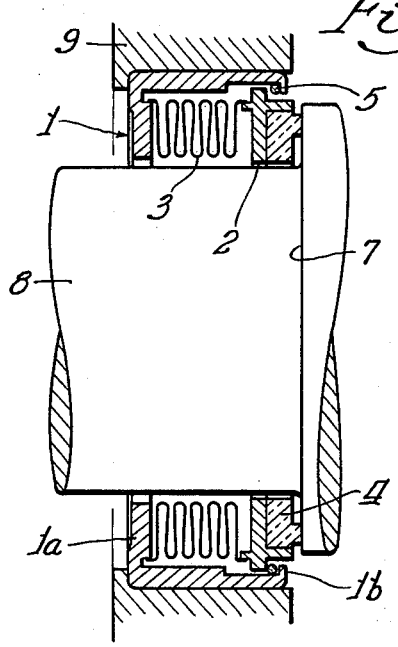
FIGURE 1 is an axial cross-sectioanl view taken along line 1—1 of FIGURE 2.
Figure 2:
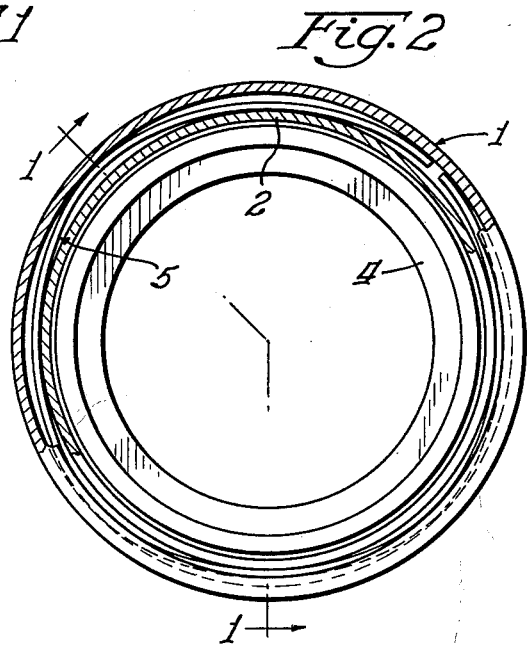
FIGURE 2 is a side elevational view, partly broken away to facilitate the showing thereof.

As best seen in FIGURES 1 and 2, the improved seal includes a generally cylindrical seal body member 1 including radially inwardly extending flanges 1a and 1b at opposite ends thereof. Flange 1a is adapted to closely surround the shaft 8 leading from a housing 9, while the smaller flange 1b functions as the lock ring retainer means as described below. An annular seal ring 2 is positioned concentrically within and spaced from the seal body to define an annular space therebetween. The sealing ring is connected to the body member 1 by a conventional seal bellows 3. The bellows, in addition to its sealing function, provides a resilient, axially directed force to urge the seal ring against a rotating face 7 on the shaft. Preferably, insert 4 is fitted within the annular recess in the seal ring 2 and may be constructed of carbon or any other well-known bearing material. A dampening lock ring 5 is fitted within the annular space between the seal ring and the seal body and is held in position by the small annular flange 1b.

Figure 4:
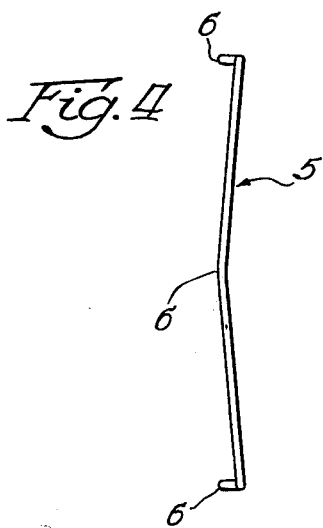
FIGURE 4 is a side, elevational view of the dampening lock ring.
Figure 3:
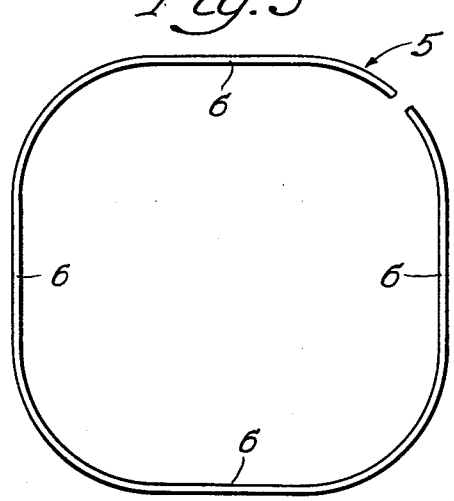
FIGURE 3 is a detailed view of the dampening lock ring.

As shown in FIGURES 3 and 4, the lock ring is constructed of relatively small-diameter wire having a uniform cross-sectional area, preferably of stainless steel. As best shown in FIGURE 3, the lock ring 5 has, prior to its insertion into the annular space between flange 1B and seal ring 2, a polygonal configuration having straight sides and rounded corners. The lock ring is discontinuous at one corner thereof to provide the necessary circumferential resiliency. Moreover, it has been found to be desirable to crimp the ring at points 6 intermediate the sides so that the corners of the ring are axially off-set with respect to the crimp points. As best seen in FIGURE 4, this crimping (shown as greatly exaggerated) produces a ring having corners which are in a plane spaced from a parallel plane passing through the intermediate portions thus providing a degree of axial resiliency to firmly fit the lock ring within the annular space between the seal ring and the seal body. As shown in FIGURE 2, the corners of the lock ring are in engagement with the inner diameter of the seal body while the intermediate positions of the sides of said lock ring are firmly in engagement with the outside diameter of the seal ring, more accurately with the axially extending flange portion of said seal ring. While the ring in its preferred form has been shown as square, it is obvious that any polygonal shape, particularly an equilateral polygonal configuration, may be used with the same results.

The manner in which the lock ring prevents vibration should be apparent. The lock ring being in resilient engagement with both the seal body and the seal ring prevents the tendency of relative movement therebetween and provides a cushioning effect to prevent a radial displacement of the seal ring relative to the seal body. The disclosed arrangement while extremely simple, effectively prevents cocking of the stationary seal face which has presented a serious problem of leakage thereacross.

While the invention has been disclosed in connection with a certain, specific embodiment thereof, it is to be understood that this is by way of example rather than limitation, and it is intended that the invention be defined by the appended claims which should be given a scope as broad as consistent with the prior art.

What is claimed is:

1. A seal comprising a generally tubular body member, a sealing ring adapted to ride against a rotatable member, resilient means for connecting said seal ring to said body member in fluid sealing relation thereto, said sealing ring being disposed concentrically within and spaced from said body member to define an annular space therebetween, and a resilient lock ring in said annular space in contiguous relation with said body member and said sealing ring, said lock ring comprising a wire member having a relatively uniform cross-sectional area and having a substantially polygonal configuration prior to insertion into said annular space.

2. The seal as defined in claim 1 wherein said resilient lock ring is in the form of an equilateral rectangle with its corners engaging said body member and the intermediate portions of the sides engaging said sealing ring.

3. A shaft seal for use in cryogenic applications comprising a generally tubular body member, an annular sealing ring adapted to ride against a rotatable member on a shaft, resilient means for connecting said seal ring to said body member in fluid sealing relation thereto, said sealing ring being disposed concentrically within and spaced from said body member to define an annular space therebetween, and a resilient lock ring in said annular space in contiguous relation with said body member and said sealing ring, said lock ring comprising a small diameter length of wire in the form of an equilateral polygon prior to insertion into said annular space, the corners of said lock ring engaging the inner surface of said body member and the intermediate portions of the sides of said lock ring engaging the outer surface of said annular sealing ring.

4. The seal defined in claim 3 wherein said resilient means comprises a bellows unit.

5. The seal defined in claim 4 wherein said sealing ring includes an annular carbon insert adapted to ride against said rotatable member.

References Cited in the file of this patent

UNITED STATES PATENTS 1,822,052  Maccabee _____ Sept. 8, 1931